United States Patent [19]

Skipper et al.

[11] Patent Number: 5,345,488
[45] Date of Patent: Sep. 6, 1994

[54] NUCLEAR FUEL ROD HAVING CONCAVE WELD ACROSS PRESSURIZATION HOLE IN END PLUG

[75] Inventors: Johnny R. Skipper, Leland; Robert A. Haughton, Wilmington; Ralph J. Reda, Wilmington; Michael T. Kiernan, Wilmington, all of N.C.

[73] Assignee: General Electric Company, San Jose, Calif.

[21] Appl. No.: 88,950

[22] Filed: Jul. 12, 1993

[51] Int. Cl.$^5$ ............................................. G21C 3/10
[52] U.S. Cl. ...................................... 376/451; 228/19
[58] Field of Search ............... 376/451, 261; 228/15.1, 228/19, 155; 219/60 R, 74, 125.1, 137 R

[56] References Cited

U.S. PATENT DOCUMENTS

| | | | |
|---|---|---|---|
| 3,180,804 | 4/1965 | Flora et al. | 376/451 |
| 3,774,010 | 11/1973 | Heer et al. | 376/451 |
| 4,075,454 | 2/1978 | Duncan et al. | 376/451 |
| 4,570,051 | 2/1986 | Miwa | 376/451 |
| 4,971,750 | 11/1990 | Duncan et al. | 376/451 |
| 5,158,740 | 10/1992 | Boatwright | 376/261 |

Primary Examiner—Daniel D. Wasil
Attorney, Agent, or Firm—J. S. Beulick

[57] ABSTRACT

A TIG welding system for controlling the weld shape for the seal welding of a small pressurization hole in the end plug of nuclear fuel rods. The controlled shape of the seal weld enables improved ultrasonic detection capabilities. The system achieves the desired weld shape by controlling the pressure differential between the interior and exterior volumes of the fuel rod. The weld box pressure is decreased in accordance with Boyle's law while the weld material for sealing the hole is molten. The system uses an output from the weld electronics as an input to a programmable logic controller ("PLC"). After a programmed time delay, the PLC outputs a signal to a solenoid valve to open a "ballast" volume. The expansion of gas from the weld box into the ballast volume causes a sudden drop in pressure to a level below the pressure inside the fuel rod. As a result of this pressure differential, the molten weld material forms a concave weld upon solidification.

4 Claims, 2 Drawing Sheets

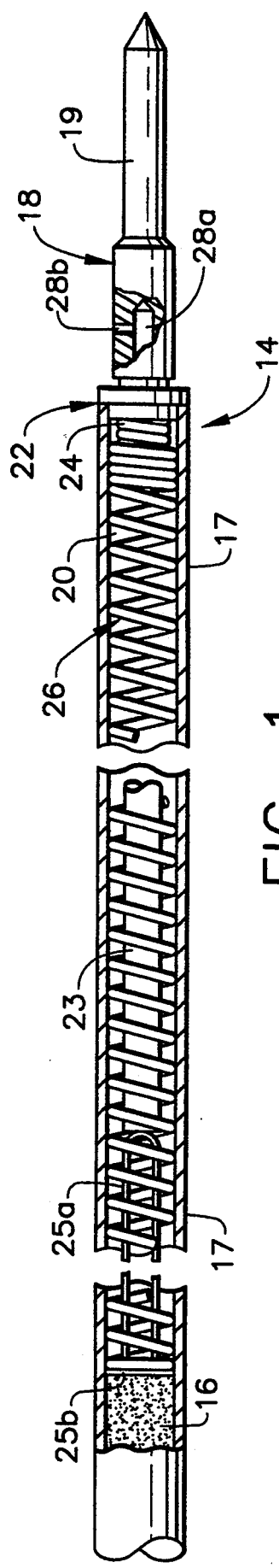
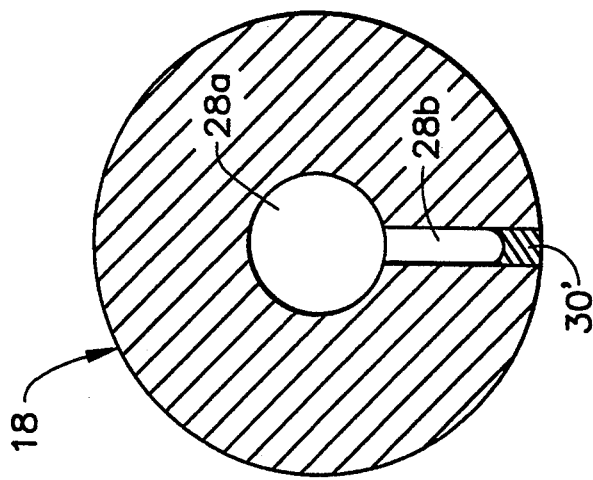
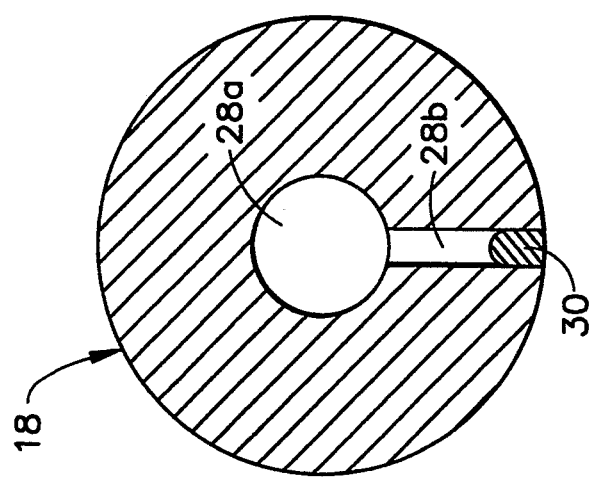
FIG. 1
FIG. 2B
FIG. 2A (PRIOR ART)

NUCLEAR FUEL ROD HAVING CONCAVE WELD ACROSS PRESSURIZATION HOLE IN END PLUG

FIELD OF THE INVENTION

This invention generally relates to the manufacture of fuel rods for a nuclear reactor. More particularly, the invention relates to the welding of the pressurization hole in the end plug of a nuclear fuel rod.

BACKGROUND OF THE INVENTION

The core of a nuclear reactor comprises a plurality of nuclear fuel bundle assemblies, each assembly consisting of a plurality of nuclear fuel rods. Each fuel rod comprises a circular cylindrical housing, i.e., cladding, which is hermetically sealed at both ends by respective end plugs. A plurality of nuclear fuel pellets are stacked in a vertical column inside the cladding to a height less than the length of the cladding, leaving a plenum space above the fuel column, which plenum space is filled with inert gas. A getter for removing contaminants from the inert interior atmosphere is conventionally installed inside the plenum.

One conventional type of fuel rod 14 (see FIG. 1) has a circular cylindrical housing 17, i.e., cladding, made of corrosion-resistant metal, e.g., zirconium alloy. The nuclear fuel is housed in cladding 17 in the form of a column of stacked pellets 16 made of fissionable and/or fertile material. Each fuel pellet is a circular cylinder having planar end faces disposed perpendicular to the cylinder axis. The pellets are stacked with end faces in abutment. A preferred fuel is uranium dioxide or a mixture comprising uranium dioxide and Gadolinia.

The cladding 17 is sealed at both ends by means of end plugs 18, only one of which is shown in FIG. 1. The end plugs are also made of zirconium alloy. Each end plug is joined to the cladding 17 by a circumferential weld generally indicated by numeral 22. Each end plug has a stud 19 which fits into a corresponding aperture in one of the tie plates to facilitate mounting of the fuel rod in the fuel bundle assembly.

During construction of the conventional fuel rod, a first end plug is inserted in an end of the cladding and welded circumferentially to form an airtight seal. The fuel pellets 16 are then inserted in the cladding to form a column, with the first pellet abutting the first end plug. When the fuel bundle assembly is installed upright in the reactor core, the fuel column has a height which is less than the height of the cladding, so that a void space or plenum 20 is provided at the upper end of the upright fuel rod.

In accordance with the construction of a known fuel rod, a standoff element 25 comprising a U-shaped standoff wire 25a sitting on a wafer-shaped base 25b is installed in plenum 20. The wafer-shaped base 25b sits on the top surface of the last pellet in the fuel column. Standoff element 25 supports a getter 23 at a predetermined height above the fuel column.

A conventional fuel rod further comprises a coiled compression spring 26 installed in plenum 20. Plenum spring 26 serves to maintain the position of the fuel pellets during handling and transportation of the fuel rods by biasing the fuel pellets toward the plugged end adjacent to the fuel column.

The plenum 20 is closed off by welding the second end plug 18 in the opposite end of cladding 17. This end plug is made of zirconium alloy. In contrast, the plenum spring 26 is stainless steel. Thus, if plenum spring 26 were in direct contact with end plug 18 during welding of the latter to cladding 17, the heat produced during welding could cause a chemical reaction between the stainless steel and the zirconium alloy. Such a chemical reaction can cause contamination of the end plug and possibly the weld.

To obviate this problem, an insert 24 made of Zircaloy is installed between end plug 18 and plenum spring 26. The conventional insert 24 is a tightly wound wire which does not act like a spring. Plenum spring 26 is provided at its end with a tightly wound wire portion 26a dimensioned to snugly receive the screwed-in insert 24. Alternatively, an insert of solid Zircaloy may be press-fit into the end of the plenum spring.

For final assembly of the fuel rod, plenum 20 must be filled with inert gas and hermetically sealed from the exterior of the rod. After the assembly comprising elements 23–26 is inserted in plenum 20, the end plug 18 is pressed against the insert 24 and fitted into the open end of cladding 17. Because this has the effect of compressing plenum spring 26, a downward axial force must be applied to hold end plug 18 in place. End plug 18 is then joined to cladding 17 by circumferential weld 22 to form a gastight seal.

End plug 18 has a radial pressurization hole 28b in fluid communication with a central axial bore 28a. The lower end of central axial bore 28a is in turn in fluid communication with plenum 20, while the radially outer end of pressurization hole 28b is in fluid communication with the exterior of the fuel rod. After end plug 18 has been welded to cladding 17, plenum 20 is evacuated and then back-filled with helium via pressurization hole 28b. The pressure of the helium is typically between 1 and 20 atm. The pressurization hole 28b is then spot welded to seal plenum 20.

Both the circumferential weld 22 and the spot weld in pressurization hole 28b must be of high integrity and must satisfy predetermined quality assurance criteria. The application of an ultrasonic probe having dual transducers permits the simultaneous, nondestructive evaluation of both the high-pressure spot weld and the circumferential weld for weld integrity characteristics.

The conventional welding method involves tungsten inert gas ("TIG") welding of pressurization hole 28b while end plug 18 is in a sealed weld box pressurized with helium. The weld process involves striking a high-current arc from a tungsten electrode to the pressurization hole 28b for 0.5 sec. The heat from the weld causes a rise in pressure of both the gas inside and the gas outside the welded pressurization hole. This system produces a spot weld 30 with a convex interior surface as shown in FIG. 2A.

During ultrasonic inspection of the integrity of spot weld 30, the ultrasonic transducer (not shown) is positioned to transmit ultrasonic energy into the weld along the axis of the pressurization hole 28b. The curvature at the outer edges of the convex interior surface of spot weld 30 causes much of the ultrasonic energy to reflect away from the transducer during inspection, thereby causing problems with the ultrasonic inspection system. Specifically, the points of minimum thickness cannot be accurately detected.

SUMMARY OF THE INVENTION

The present invention is an improvement over the conventional technique for seal welding the small pressurization hole in the end plug of a nuclear fuel rod. In particular, the invention is a TIG weld system for controlling the shape of the spot weld for sealing the small pressurization hole to provide a concave weld surface at the bottom of the weld. This concave weld shape allows the ultrasonic transducer to gain full inspection of the seal weld by increasing the amount of ultrasonic energy which is reflected by the bottom of the weld surface back to the transducer during inspection. Thus, the seal weld system in accordance with the preferred embodiment of the invention produces a concave weld which is 100% ultrasonically inspectable and gives a direct thickness measurement at the minimum thickness point.

The system achieves the desired weld shape by controlling the pressure differential between the interior volume of the fuel rod and the exterior volume of the fuel rod, i.e., the internal volume of the weld box. The weld box pressure is decreased in accordance with Boyle's law by allowing some of the gas inside the weld box to flow rapidly into a "ballast" volume while the weld material for sealing the hole is still molten. The remaining gas inside the weld box redistributes to a pressure which is lower than the pressure inside the plenum space.

The system in accordance with the preferred embodiment of the invention uses an output from the welding power supply as an input to a programmable logic controller. After a programmed time delay, the programmable logic controller outputs a signal to a solenoid valve to open the ballast volume, thereby placing the ballast volume in fluid communication with the volume inside the weld box. The expansion of gas from the weld box into the ballast volume causes a sudden drop in pressure outside the fuel rod to a level below the pressure inside the fuel rod. As a result of this pressure differential, the molten weld material forms a concave weld upon solidification.

BRIEF DESCRIPTION OF THE DRAWINGS

FIG. 1 is a partial sectional view of an upper portion of a conventional nuclear fuel rod.

FIG. 2A is a sectional view of an end plug having a pressurization hole welded in accordance with the conventional technique.

FIG. 2B is a sectional view of an end plug having a pressurization hole welded in accordance with the method of the invention.

DETAILED DESCRIPTION OF THE PREFERRED EMBODIMENT

Figure 3:
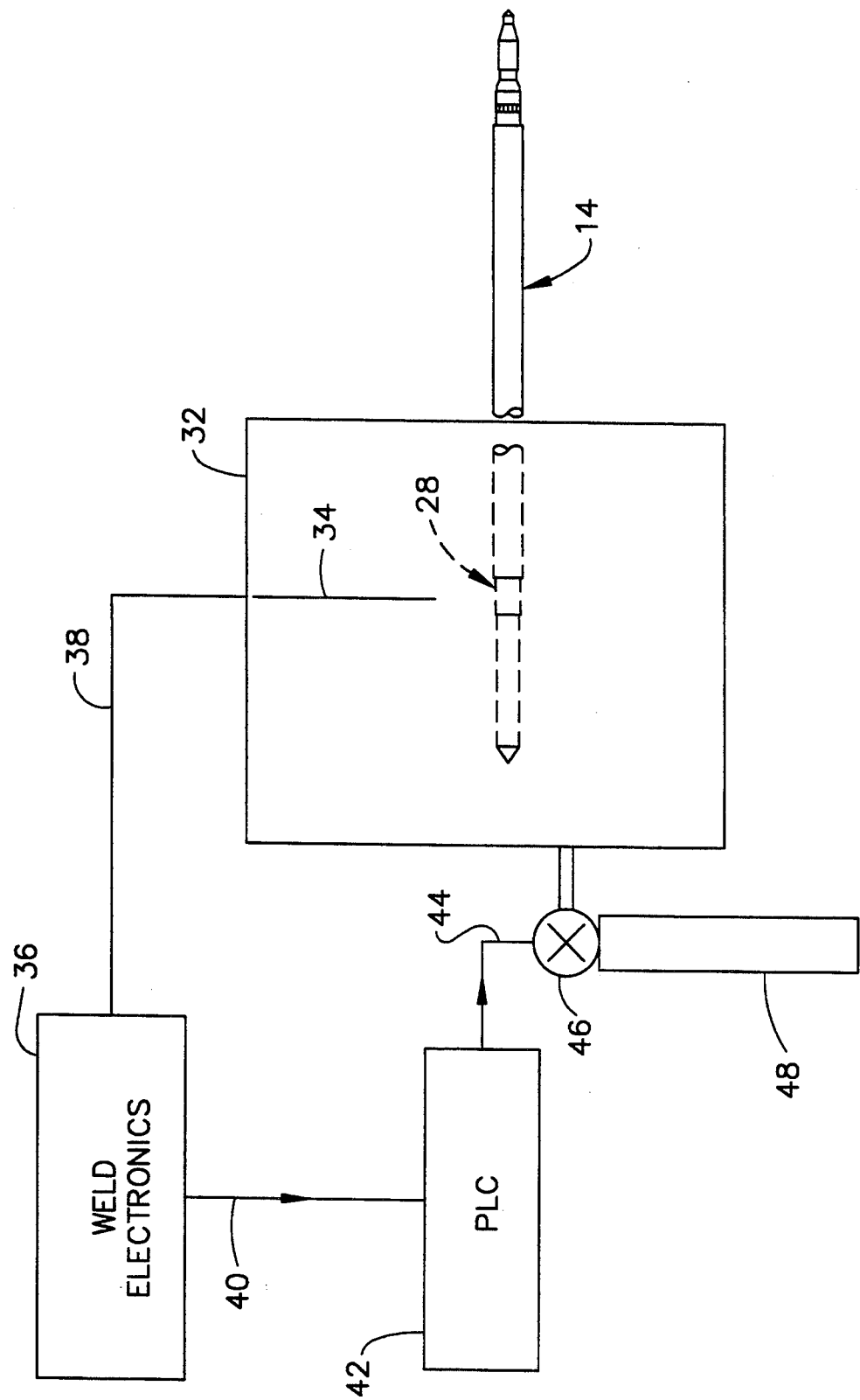
FIG. 3 is a block diagram showing the seal weld system in accordance with the preferred embodiment of the invention.

The TIG seal weld system in accordance with the preferred embodiment of the invention is shown in FIG. 3. The end plug of a nuclear fuel rod 14 having a pressurization hole 28b to be sealed is inserted inside a weld box 32. Weld box 32 is filled with helium gas which provides the atmosphere for the welding and is pressurized to produce the desired pressure (e.g. 10 atm) inside the plenum space 20 of the fuel rod. A tungsten electrode 34 is positioned inside the weld box, with the tip of the electrode opposing the unsealed pressurization hole 28b. Electrode 34 is coupled to weld electronics 36 via power supply line 38. Weld electronics 36 supplies a high current to electrode 34, thereby striking a high-current arc from the electrode to the end plug for 0.5 sec. This arc melts the weld material inserted in pressurization hole 28b. Upon cooling, the melted weld material fuses to seal the pressurization hole.

Simultaneous with striking of the arc at electrode 34, weld electronics 36 outputs a timing signal to a programmable logic controller ("PLC") 42 via signal line 40. PLC 42 controls the logic of the welding process. Preferably, PLC 42 is a Series Six manufactured by General Electric Company. PLC 42 is programmed to output an actuation signal on signal line 44 in response to receipt on line 40 of the timing signal, but with a delay of predetermined duration. The duration of the delay must be selected so that the weld material in pressurization hole 28b is still molten, e.g., 0.3–0.5 sec after the arc strike time.

A ballast tank 48 serves as the means for depressurizing the weld box. The volume inside tank 48 is at a pressure which is less than the pressure inside the weld box, e.g., 1 atm of inert gas or less. Preferably the volume inside ballast tank 48 is evacuated prior to seal welding of the pressurization hole.

Ballast tank 48 is connected to weld box 32 by way of a solenoid-controlled valve 46. Valve 46 has an open state in which ballast tank 48 is in fluid communication with the internal volume of weld box 32 and a closed state in which ballast tank 48 is not in fluid communication with the internal volume of weld box 32. The solenoid-controlled valve 46 changes from the closed state to the open state in response to the actuation signal from PLC 42. The solenoid-controlled valve 46 has a rapid response time to allow for fast opening of the depressurization volume.

When valve 46 is opened, ballast tank 48 is placed in fluid communication with weld box 32. The differential between the pressure inside the ballast tank and the pressure of the inert gas inside the weld box causes inert gas to flow rapidly from the weld box into the ballast tank. Thus, the ballast tank serves as a depressurization volume for expansion of the inert gas which initially occupies weld box 32. Expansion of the inert gas into the ballast volume reduces the pressure inside the weld box (e.g., by about 4 psi).

The basis of the method in accordance with the invention is Boyle's gas law:

$$P_1 V_1 = P_2 V_2$$

where $P_1$ and $V_1$ are the pressure and volume in an initial state respectively, and $P_2$ and $V_2$ are the pressure and volume in a second state respectively.

In the case of the weld box, the initial volume is the internal volume of the weld box and the initial pressure is usually 10 atm. The second volume includes the volume of the weld box plus the volume of the depressurization volume. Hence, from Boyle's law it can be seen that the pressure in the weld box will drop when the volume is increased.

On the other hand, the volume of plenum space 20 inside the fuel rod is unchanged during expansion of the inert gas external to the fuel rod. Therefore the pressure inside pressurization hole 28b is not decreased in the same manner as the pressure outside the fuel rod, i.e., inside the weld box. The result is a pressure on the internal side of weld spot 30' (see FIG. 2B) which is greater than the pressure on the external side of weld spot 30'. This pressure differential between the gas inside plenum space 20 and the gas inside weld box 32 causes the molten weld material to form a meniscus in the outward direction as opposed to the inward direction. This concave interior surface will reflect more ultrasonic energy back to a transducer arranged on the surface of the end plug along the axis of pressurization hole $28b$ than will the convex interior surface of the prior art. The result is a fully inspectable weld which reflects ultrasonic waves back to the transducer at its minimum thickness point.

The preferred embodiment of the invention has been described for the purpose of illustration only. Variations and modifications will be readily apparent to those skilled in the pertinent art. For example, the means for providing a delayed actuation signal to the solenoid-actuated valve need not be a programmable logic controller. Once the duration of the desired delay has been determined, any suitable electrical delay circuit can be used. Also the valve can be actuated by means other than a solenoid. All such variations and modifications are intended to be encompassed by the claims set forth hereinafter.

We claim:

1. A nuclear fuel rod comprising a plenum space filled with gas and an end plug having a pressurization hole sealed by weld material, wherein said weld material has a concave interior surface formed across said pressurization hole.

2. The nuclear fuel rod as defined in claim 1, wherein said gas is inert.

3. The nuclear fuel rod as defined in claim 1, wherein said pressurization hole is in fluid communication with said plenum space.

4. The nuclear fuel rod as defined in claim 1, wherein the pressure inside said plenum space is 1–20 atm.

* * * * *